United States Patent
Stegall

(10) Patent No.: US 8,743,709 B1
(45) Date of Patent: Jun. 3, 2014

(54) PROVIDING A SIGNALING INTERFACE BETWEEN A CIRCUIT-SWITCHED DOMAIN AND A PACKET-SWITCHED DOMAIN TO ENABLE PROVISION OF SERVICES TO A MULTI-MODE MOBILE STATION

(75) Inventor: Mark A. Stegall, Melissa, TX (US)

(73) Assignee: Apple Inc., Cupertino, CA (US)

( * ) Notice: Subject to any disclaimer, the term of this patent is extended or adjusted under 35 U.S.C. 154(b) by 1851 days.

(21) Appl. No.: 11/811,839

(22) Filed: Jun. 12, 2007

Related U.S. Application Data

(60) Provisional application No. 60/813,118, filed on Jun. 12, 2006, provisional application No. 60/836,503, filed on Aug. 9, 2006.

(51) Int. Cl.
*H04L 12/26* (2006.01)

(52) U.S. Cl.
USPC .................. 370/252; 370/254; 370/331

(58) Field of Classification Search
None
See application file for complete search history.

(56) References Cited

U.S. PATENT DOCUMENTS

| | | | |
|---|---|---|---|
| 2002/0110104 A1* | 8/2002 | Surdila et al. | 370/338 |
| 2003/0027569 A1* | 2/2003 | Ejzak | 455/432 |
| 2004/0246990 A1* | 12/2004 | Krishnamurthi et al. | 370/466 |
| 2005/0070251 A1* | 3/2005 | Satake et al. | 455/411 |
| 2005/0261006 A1* | 11/2005 | Hirsbrunner et al. | 455/457 |
| 2007/0076696 A1* | 4/2007 | An et al. | 370/352 |
| 2007/0217354 A1* | 9/2007 | Buckley | 370/328 |
| 2008/0287104 A1* | 11/2008 | Sundberg et al. | 455/412.1 |
| 2009/0016330 A1* | 1/2009 | Witzel et al. | 370/352 |
| 2009/0124254 A1* | 5/2009 | Witzel et al. | 455/435.1 |

OTHER PUBLICATIONS $3^{rd}$ Generation Partnership Project (3GPP), "Voice Call Continuity between CS and IMS Study", 3GPP TR23.806 v7.0.0, Dec. 2005.*

* cited by examiner

*Primary Examiner* — Andrew Chriss
*Assistant Examiner* — Salvador E Rivas
(74) *Attorney, Agent, or Firm* — Meyertons, Hood, Kivlin, Kowert & Goetzel, P.C.

(57) ABSTRACT

Services are provided to a multi-mode mobile station that is attachable to a packet-switched access network and a circuit-switched access network. A first message indicating a service relating to the multi-mode mobile station is received, and in response to the first message, a control message is sent over a signaling interface from a first node in a circuit-switched domain to a second node in a packet-switched domain. The control message contains a circuit-switched control indication to enable the service to be performed.

17 Claims, 10 Drawing Sheets

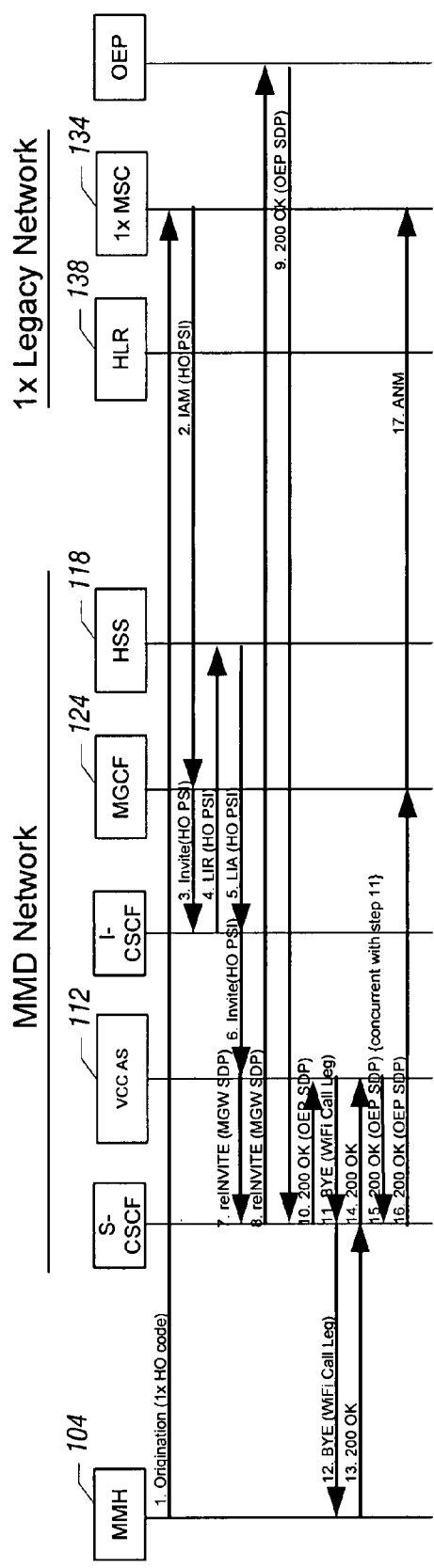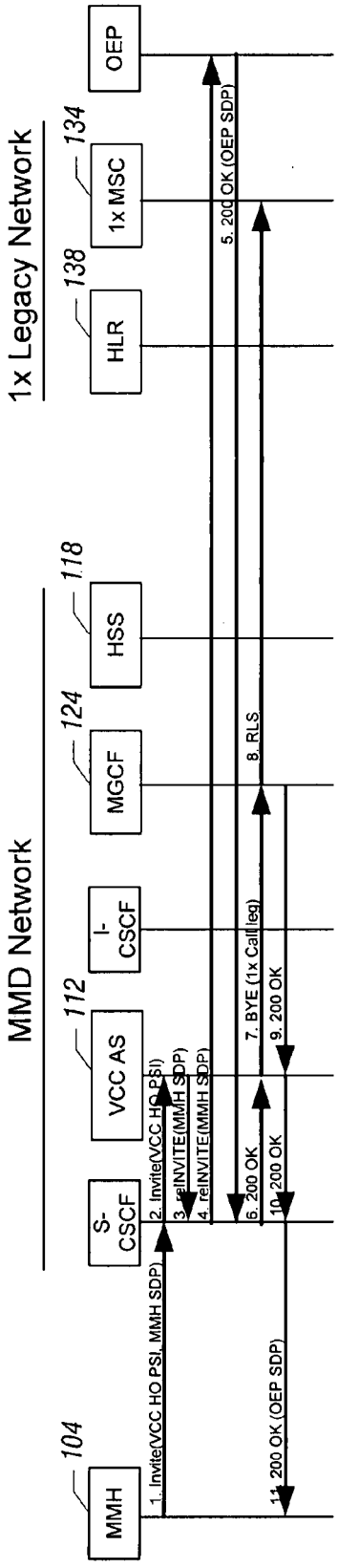
FIG. 10
FIG. 11

PROVIDING A SIGNALING INTERFACE BETWEEN A CIRCUIT-SWITCHED DOMAIN AND A PACKET-SWITCHED DOMAIN TO ENABLE PROVISION OF SERVICES TO A MULTI-MODE MOBILE STATION

CROSS-REFERENCE TO RELATED APPLICATION

This claims the benefit under 35 U.S.C. §119(e) of Provisional Application Ser. No. 60/813,118, entitled "Methods and Procedures for MMD Assisted Service (MAS)," filed Jun. 12, 2006, and of Provisional Application Ser. No. 60/836,503, entitled "MMD Assisted Services with Selective Anchoring," filed Aug. 9, 2006, which are hereby incorporated by reference.

TECHNICAL FIELD

The invention relates generally to providing services to a multi-mode mobile station that is able to operate over packet-switched and circuit-switched access networks.

BACKGROUND

Mobile or wireless communications networks are capable of carrying circuit-switched and packet-switched traffic (e.g., voice traffic, data traffic, etc.) between mobile stations and other endpoints, which can be another mobile station or an endpoint connected to a network such as a public-switched telephone network (PSTN) or a packet data network. Traditional wireless protocols provide for circuit-switched communications, such as the circuit-switched protocol provided by 1xRTT, defined by CDMA 2000. With circuit-switched communications, a dedicated circuit or channel is established between nodes and terminals to allow communication between endpoints. Each circuit that is dedicated cannot be used by other users until the circuit or channel is released.

In contrast, with packet-switched communications, data is split into packets, with the packets routed individually over one or more paths. A widely-used form of packet-switched communications is defined by the Internet Protocol (IP). Examples of packet-switched communications that are possible over data networks include electronic mail, web browsing, file downloads, electronic commerce transactions, voice or other forms of real-time, interactive communications, and others. To enable the establishment of packet-switched communications sessions in a network, various control functions (implemented with software and/or hardware) are deployed in the network. Some standards bodies have defined subsystems within communications networks that include such control functions. One such standards body is the Third Generation Partnership Project (3GPP), which has defined an Internet Protocol (IP) multimedia subsystem (IMS) that includes various control functions for provision of IP multimedia services, including audio, video, text, chat, or any combination of the foregoing.

In the 3GPP2 context, the equivalent of the IP multimedia subsystem is sometimes referred to as a multimedia domain (MMD) network. The term "multimedia network" is used to generally refer to any one of an IP multimedia subsystem, MMD network, or any other network in which multimedia communications (any one or more of video, audio, text, chat, e-mail, web browsing, etc.) are possible.

To provide wireless access to a multimedia network, a wireless access network according to any of the following standards can be used: 1xEV-DO or 1xEV-DV (which are defined by the CDMA 2000 family of standards), WiFi (which is a wireless local area network or WLAN technology defined by the IEEE 802.11 specifications), and WiMAX (Worldwide Interoperability for Microwave Access) (which is also a WLAN technology defined by the IEEE 802.16 specifications). Note that 1xRTT also provides packet-switched communications, in addition to circuit-switched communications.

It is common for circuit-switched access networks (such as those based on 1xRTT) to coexist with packet-switched access networks for multimedia networks. Certain mobile stations are able to operate with both circuit-switched wireless access networks and packet-switched wireless networks. Such mobile stations are referred to as multi-mode mobile stations or multi-mode handsets.

Conventionally, when a multi-mode mobile station transitions between a packet-switched wireless access network and a circuit-switched wireless access network, the set of services provided to the multi-mode mobile station changes. When attached to the packet-switched access network, nodes (e.g., application servers or other nodes) in the multimedia network (part of a packet-switched service domain) provides services to the mobile station. However, when the mobile station transitions to the circuit-switched access network, services to the mobile station are provided by nodes in the circuit-switched service domain.

As a result, when a multi-mode mobile station transitions between a circuit-switched access network and a packet-switched access network, the services provided to the multi-mode mobile station will be interrupted since the provider of the services will have to switch to a different service domain.

SUMMARY

In general, according to an embodiment, a method provides services to a multi-mode mobile station that is attachable to a packet-switched access network and a circuit-switched access network. A first message indicating a service relating to the multi-mode mobile station is received, and in response to the first message, a control message is sent over a signaling interface from a first node in a circuit-switched domain to a second node in a packet-switched domain. The control message contains a circuit-switched control indication to enable the service to be performed.

Other or alternative features will become apparent from the following description, from the drawings, and from the claims.

BRIEF DESCRIPTION OF THE DRAWINGS

FIGS. 2-14 illustrate various message flows to perform various different services, in accordance with some embodiments.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
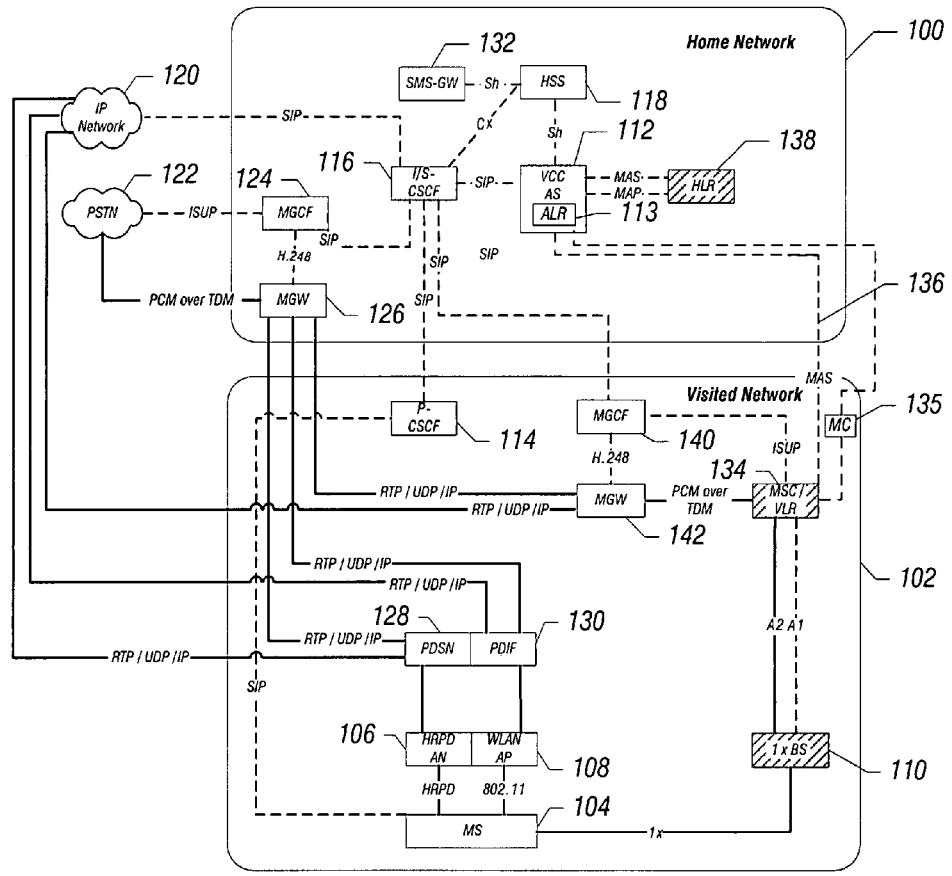
FIG. 1 is a block diagram of a communications network that includes a home network and a visited network, according to an embodiment.

FIG. 1 illustrates an example arrangement of a wireless communications network that includes a home network 100 and a visited network 102, from the perspective of a mobile station 104. The home network 100 is the home network of the mobile station 104 and the visited network 102 is a different network in which the mobile station 104 is currently located.

Note that various links between the various nodes depicted in FIG. 1 are not shown, to enhance clarity. Also, note that the arrangement depicted in FIG. 1 is merely provided for purposes of example, as other implementations can use other arrangements.

The mobile station 104 is a multi-mode mobile station that is able to operate over either a packet-switched access network or a circuit-switched access network. Examples of a packet-switched access network include one or more of the following: 1xEV-DO or 1xEV-DV access network 106 according to CDMA (code division multiple access) 2000, also referred to as HRPD (high rate packet data); and a wireless local area network (WLAN) access network 108, such as a WLAN access network defined by WiFi (IEEE 802.11a, 802.11b, or 802.11g) or by WiMAX (IEEE 802.16 or 802.16a). Other forms of packet-switched wireless access networks can also be employed in other implementations.

Examples of a circuit-switched access network include a 1xRTT (also defined by CDMA 2000) access network, as provided by a 1xRTT base station 110 in FIG. 1. The packet-switched wireless access network and circuit-switched wireless access network shown in FIG. 1 are both part of the visited network 102. Thus, the mobile station 104 is able to transition between the packet-switched access network and the circuit-switched access network (or alternatively, the mobile station 104 can be attached to both the packet-switched access network and circuit-switched access network) while the mobile station 104 is operating in the visited network. Note that 1xRTT can also provide packet-switched services. Thus, reference to "circuit-switched" refers to a network or domain that is able to provide circuit-switched services and possibly, in addition, packet-switched services.

In accordance with some embodiments, the set of services provided to the mobile station 104 is provided by a multimedia network in a packet-switched service domain regardless of whether the mobile station 104 is attached to the packet-switched access network or the circuit-switched access network. Attachment to an access network means that the mobile station is currently communicating with a remote node over the access network. Effectively, in some embodiments, the services provided to the multi-mode mobile station are anchored at the multimedia network regardless of whether the mobile station is attached to the packet-switched access network or the circuit-switched access network. Consequently, end user service operation is not impacted by how the multi-mode mobile station is attached. As discussed further below, another embodiment provides for a selective anchoring feature to allow for a dynamic determination of whether or not a circuit-switched attached mobile station is to be anchored in the packet-switched domain.

The term "multimedia network" refers to any network that has control functions providing packet-switched multimedia services. Control functions in a multimedia network are able to exchange packet-switched messaging (packet-switched call control messaging such as Session Initiation Protocol or SIP messaging) to establish or control a packet-switched multimedia call session. A "packet-switched call control message" refers to a call control message that is used to initiate, terminate, or control packet-switched call sessions, such as call sessions that provide multimedia services. A "multimedia call session" or "call session" refers to any session for communicating of any one or more of voice, other audio, video, text, chat, and others. A "control function" refers to hardware and/or software for performing call control tasks to enable establishment of multimedia call sessions. Examples of multimedia networks include the Internet Protocol (IP) multimedia subsystem (IMS) defined by 3GPP (Third Generation Partnership Project), the multimedia domain (MMD) provided by 3GPP2, or any other network in which multimedia communications can be performed.

By anchoring services in the multimedia domain, a service model that provides seamless services can be offered that is independent of access networks that the mobile station 104 is attached to. Seamless service operation is further supported by use of a common service model and service control interface.

According to some embodiments, the service model is referred to as an MMD assisted services (MAS) model, which provides an architecture that reduces overall impact on an existing 1xRTT (or other circuit-switched) services architecture. By using the MAS model, changes to the 1xRTT or other circuit-switched network architecture is focused on the home location register (HLR) 138 and the mobile switching center (MSC) 134. Other entities in the circuit-switched network are minimally impacted or are not impacted at all. By using the MAS model, the scope of network equipment development is reduced to increase the speed with which the solution can be made available in the marketplace.

The MAS model enables centralized multimedia domain control of services independent of the access network in use by the mobile station. This in turn enables a seamless service set provided to the mobile station whether or not the mobile station is attached to the circuit-switched network or the packet-switched access network. Moreover, seamless inter-domain transfer between circuit-switched and packet-switched domains can be performed.

The MAS model provides a solution for enabling circuit-switched attached mobile stations to execute services under the control of the multimedia network service domain. In the MAS model, the circuit-switched network is used to provide bearer connectivity between the mobile station and the multimedia network domain. However, for circuit-switched attached multi-mode mobile stations, the multimedia network offers and controls mid-call services using circuit-switched control messages or indications.

In FIG. 1, the multimedia network includes nodes in both the visited network 102 and the home network 100. The multimedia network includes nodes 112, 114, 116, 118, 124, 126, 132, 140, and 142 (discussed further below). The multimedia network can be considered to be part of a packet-switched service domain. The packet-switched service domain also includes the packet-switched access network (106, 108) and the packet data node (128, 130). On the other hand, a circuit-switched service domain includes the circuit-switched access network (base station 110) and nodes 134 and 138 (discussed further below). Although illustrated as being separate nodes, some of the nodes depicted in FIG. 1 can be combined into one physical node (e.g., a computing system).

The set of services provided to the mobile station 104 can be provided by an application server 112 as well as other nodes in the multimedia network, discussed further below. In one implementation, the application server 112 is a voice call continuity (VCC) application server. However, in other implementations, other types of application servers are used. Generally, an application server can provide various services, including call waiting, caller ID, call hold, push-to-talk, call transfer, lawful intercept, voicemail, conference call, location-based services, and so forth. Although just the VCC application server 112 is depicted, other application servers may also be present in the multimedia network. Note that various control functions (discussed below) in the multimedia network can also provide services.

When the mobile station 104 is attached to the packet-switched access network (106 or 108), the mobile station 104 is able to communicate signaling through various control functions of the multimedia network, which signaling can include SIP call control messages. SIP is an application-layer control (signaling) protocol for creating, modifying, and terminating multimedia sessions (any one or more of a voice session, other audio session, video session, text session, chat session, or any combination of the foregoing). SIP is used as the call control signaling protocol by the various control functions in the home network 100 and the visited network 102. SIP is described in Request for Comments (RFC) 3261, entitled "SIP: Session Initiation Protocol," dated June 2002.

In the example of FIG. 1, the mobile station 104 communicates SIP signaling with a proxy call session control function (P-CSCF) 114, which is the first SIP aware control contact point for a terminal, such as the mobile station 104, in a multimedia network. The P-CSCF 114 further communicates SIP signaling with an interrogating CSCF (I-CSCF) or serving CSCF (S-CSCF) 116 in the home network 100. An I-CSCF is the contact point within a service operator's network for connections destined to users in the service operator's network. Example tasks performed by the I-CSCF include handling initial registration by interrogating a home subscriber server (HSS) 118, routing of a call control message received from another network towards an S-CSCF, and other tasks. An S-CSCF handles session control within the multimedia network on behalf of terminals.

As depicted in FIG. 1, the I/S-CSCF 116 communicates SIP signaling with the application server 112. Thus, when a mobile station 104 desires to establish a call session, SIP signaling is exchanged with the P-CSCF 114, I/S-CSCF 116, and application server 112. The call to be established can be with an endpoint that is coupled to an Internet Protocol (IP) network 120, a public switched telephone network (PSTN) 122, or another mobile station in the home network 100 or the visited network 102 (or in some other wireless network). To establish a call session with an endpoint coupled to the IP network 120, SIP signaling is exchanged by the I/S-CSCF 116 with the endpoint and/or other control functions on the IP network 120. To establish a call session with an endpoint coupled to the PSTN 122, SIP signaling is exchanged between the I/S-CSCF 116 and a media gateway control function (MGCF) 124, which performs call control protocol conversion between SIP and a circuit-switched call messaging protocol, such as an ISUP (ISDN User Part) protocol that is part of the Signaling System No. 7 (SS7) protocol used to set up telephone calls in a PSTN. The MGCF 124 also controls a media gateway (MGW) 126, such as by using H.248 control messages. The media gateway 126 converts between bearer traffic in packet-switched format and bearer traffic in circuit-switched format.

For short message service (SMS) communications, an SMS gateway 132 and messaging center 135 are provided.

Once a call session is established using the control functions and application server discussed above, then bearer traffic of the established call session is communicated by the mobile station through the packet-switched access network (106 or 108) to a respective packet data serving node (PDSN) 128 or a packet-data interworking function (PDIF) 130. The PDSN 128 is used with the 1xEV-DO or 1xEV-DV access network, whereas the PDIF 130 is used with the WLAN access network 108. Generally, the PDSN 128 or PDIF 130 is a "packet data node" that is used as an interface between the wireless access network and the IP network 120. The PDSN 128 or PDIF 130 is able to communicate bearer traffic using UDP/IP (User Datagram Protocol/Internet Protocol) packets in some implementations. For voice data or other forms of real-time data, the bearer traffic can be in Real-Time Protocol (RTP) format.

The above describes the paths through the packet-switched access network to allow provision of a set of services from the multimedia network. If the mobile station 104 is attached to the circuit-switched access network (base station 110) instead of the packet-switched access network (106 or 108), then a different path is provided to enable the multimedia network to provide the same set of services to the mobile station 104.

This path includes the air interface between the mobile station 104 and the circuit-switched base station 110 (e.g., 1xRTT base station). The base station 110 is connected to the MSC 134. In accordance with some embodiments, a signaling interface 136 (referred to as the MAS signaling interface), is provided between the MSC 134 and the VCC application server 112. The MAS signaling interface 136 allows for provision of various services to the multi-mode mobile station 104 with no impact on signaling used between the mobile station 104 and base station 110, and between the base station 110 and the MSC 134.

The MAS signaling interface can either be an IP-based signaling interface or an SS7-based signaling interface. The MAS signaling interface defines control messages to carry circuit-switched control indications (e.g., registration requests, origination requests, etc.).

The MAS signaling interface 136 between the MSC 134 and the VCC application server 112 allows for exchanges of messaging between the MSC 134 and the VCC application server 112 to allow for origination and termination, as well as mid-call services, to be provided on behalf of a multi-mode mobile station that is attached to a circuit-switched access network. The services provided to the circuit-switched attached mobile station are under the control of the packet-switched service domain. In the MAS model, the circuit-switched network is used to provide bearer connectivity between the mobile station and the packet-switched domain, while the packet-switched network offers and controls mid-call services using circuit-switched control messages or indications.

The following describes various message flows relating to various tasks to be performed with respect to a multi-mode mobile station according to the MAS model. In the ensuing discussion, it is assumed that the circuit-switched network is the 1xRTT network, while the packet-switched network (or multimedia network) is the MMD network.

Figure 2:
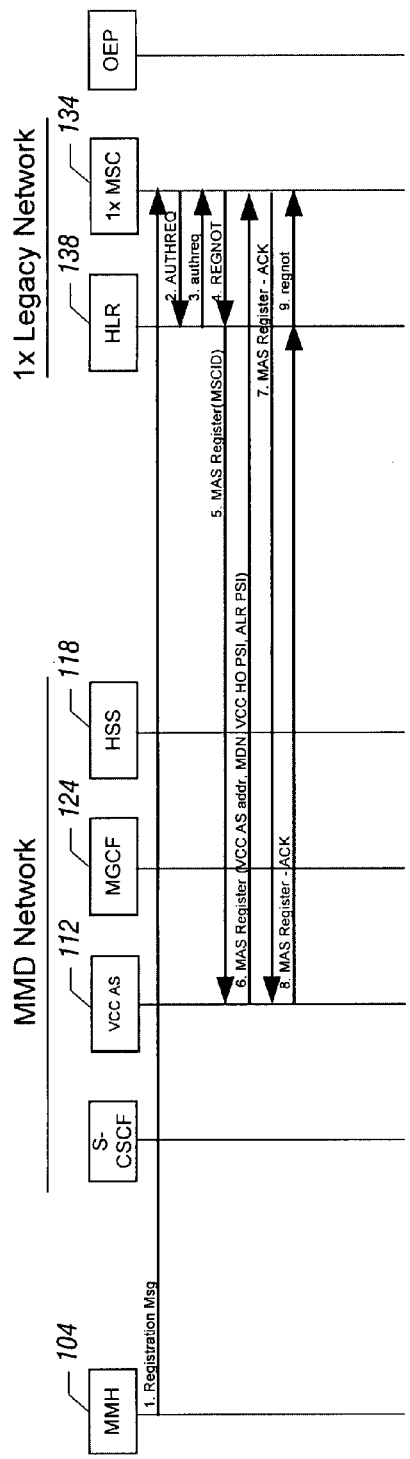

FIG. 2 illustrates registration (1xRTT registration and MAS registration) performed by the mobile station 104 (labeled as "MMH" in FIG. 2) when the mobile station is attached to the 1xRTT network. The mobile station 104 performs 1xRTT registration by sending a 1xRTT registration message (step 1) to the MSC 134 (which is assumed to be the serving MSC in this flow). In response to the 1xRTT registration message, the MSC 134 sends (step 2) an AUTHREQ (authorization request) message to the HLR 138 of the registering party (in this case the mobile station 104). The AUTHREQ message is an HLR authentication request defined by ANSI-41 to validate a mobile station. The HLR 138 responds (step 3) with an authreq message to the MSC 134 to indicate that the mobile station 104 has been validated.

Next, the MSC sends (step 4) a REGNOT (registration notification) message to the HLR 138, which is also an ANSI-41 message that provides registration notification from the MSC 134 to the HLR 138. Steps 1-4 in FIG. 2 are part of a standard 1xRTT HLR registration procedure to the point that the HLR is ready to send a regnot message (acknowledge of REGNOT) to the MSC 134. Note that regnot is sent later at step 9 in FIG. 2.

In response to REGNOT (step 4), the HLR 138 sends a MAS Register message (step 5) to the VCC application server 112. The MAS Register message refers to a MAS message that carries a 1xRTT registration request. The MAS Register message contains an identifier of the serving MSC, where the identifier is referred to as MSCID. Note that the subscriber data contained in the HLR has an MAS user tag that identifies the VCC application server 112. Note also that the HLR contains the MSCID of the MSC requesting registration. Although not depicted in FIG. 2, it is noted that in some scenarios the VCC application server 112 may redirect the registration request within the MMD network to a different VCC application server based on the current mobile station registration state, HSS provisioning, or other MMD defined criteria.

In response to the MAS Register message, the VCC application server 112 looks up the MSCID in a provisioned list of MAS capable MSCs to retrieve the address of the MSC. The VCC application server then forwards the MAS Register message (step 6) to the MSC, where the Register message sent at step 6 contains the VCC application server contact address associated with the user, the mobile directory number (MDN) of the user, and a handoff public service identity (HO PSI) to be used in the event of an inter-domain handoff. The Register message also contains the ALR PSI/DN to be used for ALR updates when the mobile station is attached to the 1xRTT access network, to allow the mobile station to notify the MMD network which access network the mobile station is currently attached to, and the RF conditions of the attached network(s). Note that the MAS Register message (step 5) triggers the ALR 113 in the VCC application server 112 to update its record for the mobile station to reflect 1xRTT RF availability.

In response to the MAS Register message received at step 6, the MSC returns an MAS Register-ACK (step 7) message to acknowledge the MAS Register message received at step 6. The VCC application server 112 forwards the MAS Register-ACK message (step 8) to the HLR, which then responds by sending (step 9) the regnot message to the MSC to acknowledge the REGNOT message sent at step 4 from the MSC to the HLR. At this point, the 1xRTT message registration procedure is completed.

Note that MAS registration updates are triggered by the HLR as the mobile roams across the 1xRTT network and updates its MSC registration data. When the HLR is updated with a new registration, the MAS registration is updated as well. The procedure described in connection with FIG. 2 is repeated for re-registration as the mobile station roams.

Figure 3:
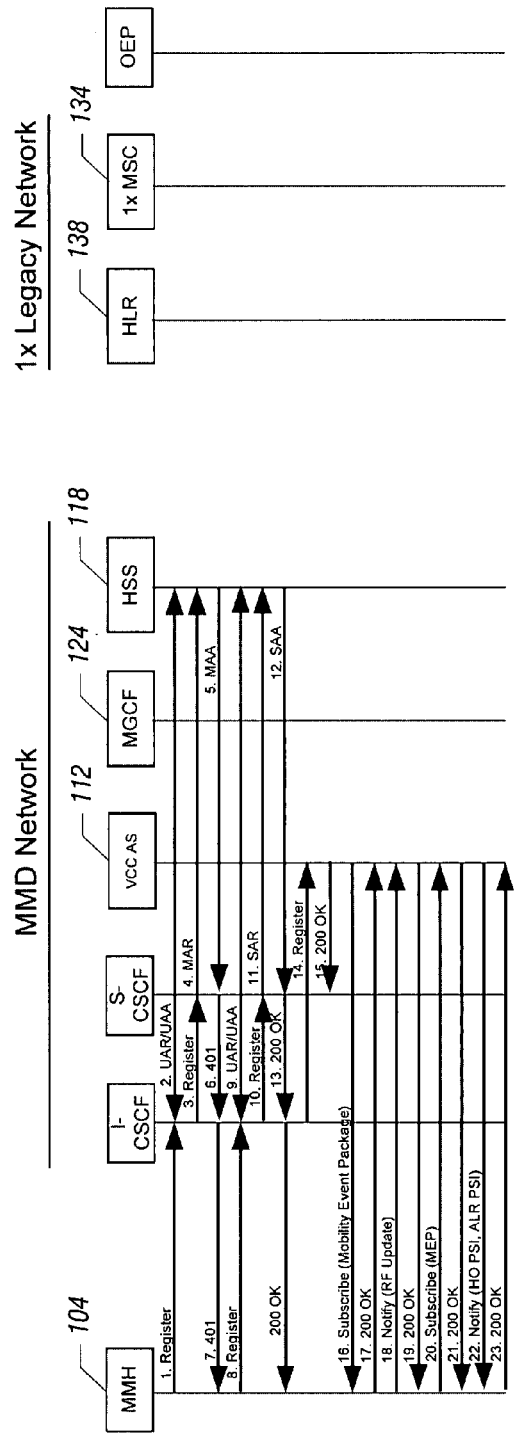

FIG. 3 shows a registration procedure that is performed by a mobile station that is attached to the packet-switched access network. The messages exchanged in steps 1-15 of FIG. 3 are part of a standard MMD registration procedure that is performed between the mobile station 104 and the MMD domain. To perform registration, the mobile station 104 generates a SIP Register message, which is sent (step 1) from the mobile station 104 to the I-CSCF. The I-CSCF, in response, queries (step 2) the HSS with a UAR (User Authorization Request) message for the identification of the serving CSCF (S-CSCF). The HSS responds (step 3) with an UAA (User Authorization Answer) message that identifies the S-CSCF and/or S-CSCF options.

After identifying the S-CSCF, the I-CSCF forwards the Register message (step 3) to the identified S-CSCF. In response, the S-CSCF queries (step 4) the HSS with an MAR (Multimedia Authentication Request) message to ask for authorization data and to check for access permission. The HSS responds (step 5) with an MAA (Multimedia Authentication Answer) message that indicates challenge. In response to the MAA message that indicates challenge, the S-CSCF sends (step 6) a SIP 401 Unauthorized message to the I-CSCF, which indicates that user authentication is required. The SIP 401 message is forwarded (step 7) from the I-CSCF to the mobile station 104.

In response to the 401 message, the mobile station re-attempts the registration by sending another SIP Register message (step 8) to the I-CSCF, which exchanges (step 9) another round of UAR and UAA messages with the HSS. The I-CSCF also forwards (step 10) the SIP Register message received at step 8 to the S-CSCF. In response to the SIP Register message at step 10, the S-CSCF sends an SAR (Server Assignment Request) message to the HSS (step 11). In response, the HSS sends (step 12) an SAA (Server Assignment Answer) message to the S-CSCF, where the SAA message contains the name of the server that is currently serving the user. Note that the name of the server is the VCC application server 112. In response to the SAA message, the S-CSCF sends a SIP 200 OK message (step 13) to the I-CSCF, which is forwarded to the mobile station. The I-CSCF also forwards (step 14) the SIP Register message received at step 10 to the VCC application server 112, which responds (step 15) with a 200 OK message to the S-CSCF. At this point, MMD registration has been performed.

Next, the VCC application server 112 subscribes to mobility event package notifications by sending (step 16) a SIP Subscribe message to the mobile station 104. The SIP Subscribe message is described in RFC 3265, entitled "Session Initiation Protocol (SIP)—Specific Event Notification," dated June 2002. The Subscribe message is acknowledged with the 200 OK message (step 17). The Subscribe message notifies the mobile station 104 that the VCC application server is to be notified of predetermined events. To notify the VCC application server of these events, the mobile station 104 sends SIP Notify messages to the VCC application server. The Notify message is also described in RFC 3265.

In FIG. 3, a Notify message is sent (step 18) from the mobile station to the VCC application server, where the Notify message of step 18 contains an RF update to notify the VCC application server of the current RF conditions over the air interface. The Notify message is acknowledged with a 200 OK message (step 19) from the VCC application server to the mobile station.

The mobile station 104 also subscribes to the VCC application server 112 to subscribe to mobility event package notifications by sending (step 20) a Subscribe message to the VCC application server, which is acknowledged (step 21) with a 200 OK message. In response, the VCC application server sends a Notify message (step 22) to the mobile station 104, where the Notify message contains a handoff public service identity (HO PSI) to be used during inter-domain handoff procedures. The Notify message of step 22 also contains the ALR PSI/DN to be used for ALR updates. The Notify message is acknowledged with the 200 OK message (step 23).

In the manner described above, the multi-mode mobile station 104 performs dual registration in both the packet-switched and circuit-switched domains; in other words, the mobile station 104 performs registration with both the home location register (HLR) 138 (in the home network 100) and the home subscriber server (HSS) 118 (also in the home network 100). The HLR 138 is the central database used for the circuit-switched service domain that contains details of each mobile station subscriber that is authorized to use the circuit-switched service domain. The combination of the S-CSCF 116 and the HSS 118 is the equivalent of the HLR used in the packet-switched service domain.

Dual registration at both the HLR and HSS helps to reduce or eliminate issues associated with "ping-pong" registrations between service domains (such as when the mobile station transfers between different domains a number of times). Also, the dual registrations allow the mobile station to utilize multiple access domains simultaneously (to perform simultaneous communications over both the circuit-switched access network and the packet-switched access network). One example application of this is voice communication over the circuit-switched access network concurrent with video streaming over the packet-switched access network.

Because of the dual registration performed by the multi-mode mobile station, there is a possibility of stale registration if the multi-mode mobile station loses connection with one of the packet-switched access network and circuit-switched access network. For example, if the packet-switched service domain is not aware that the mobile station 104 is no longer reachable over the packet-switched access network (106 or 108), then the packet-switched service domain may still attempt to page the mobile station 104 through the packet-switched access network, which is wasteful of system resources. In accordance with some embodiments, information regarding the availability of the mobile station over a particular access network (along with timestamp information) is passed to an availability location register (ALR) 113 in the application server 112. By keeping the availability of the mobile station over a particular access network up-to-date in the ALR 113, failed call delivery and/or unnecessary use of paging channel resources can be avoided or reduced. The timestamp information is provided to the ALR 113 to properly determine whether or not RF update information provided by the mobile station is stale.

The ALR 113 can be used by the multimedia network 202 to determine the optimal technique of service delivery to a multi-mode mobile station. The ALR 113 can maintain information received from the multi-mode mobile station regarding the quality of radio frequency (RF) coverage in the different access networks, such that the multimedia network 202 can determine the optimal way to provide service to the mobile station. The multimedia network 202 can also deliver service to the mobile station 104 according to the geographic location of the mobile station, the time of day, or other criteria. The ALR 113 allows a network to make intelligent service delivery decisions regarding the optimal network to deliver services. This can be done without impacting registration state of the mobile station and without driving additional registration traffic. Note that the ALR 113 is not present in a conventional communications system, as the conventional communications system typically employs just one path for service delivery to a mobile station.

The MSC 134 in the visited network 102 also includes a visitor location register (VLR), which is a database that stores information about mobile stations that are currently being served by the MSC 134. For communicating with nodes in the multimedia network, the MSC 134 is able to communicate through an MGCF 140 and a media gateway 142, which are similar to the MGCF 124 and media gateway 126 discussed above. Thus, when the mobile station 104 is attached to the circuit-switched access network, it is able to communicate signaling and data through the MGCF 140 and media gateway 142, respectively, with the multimedia network.

Figure 4:
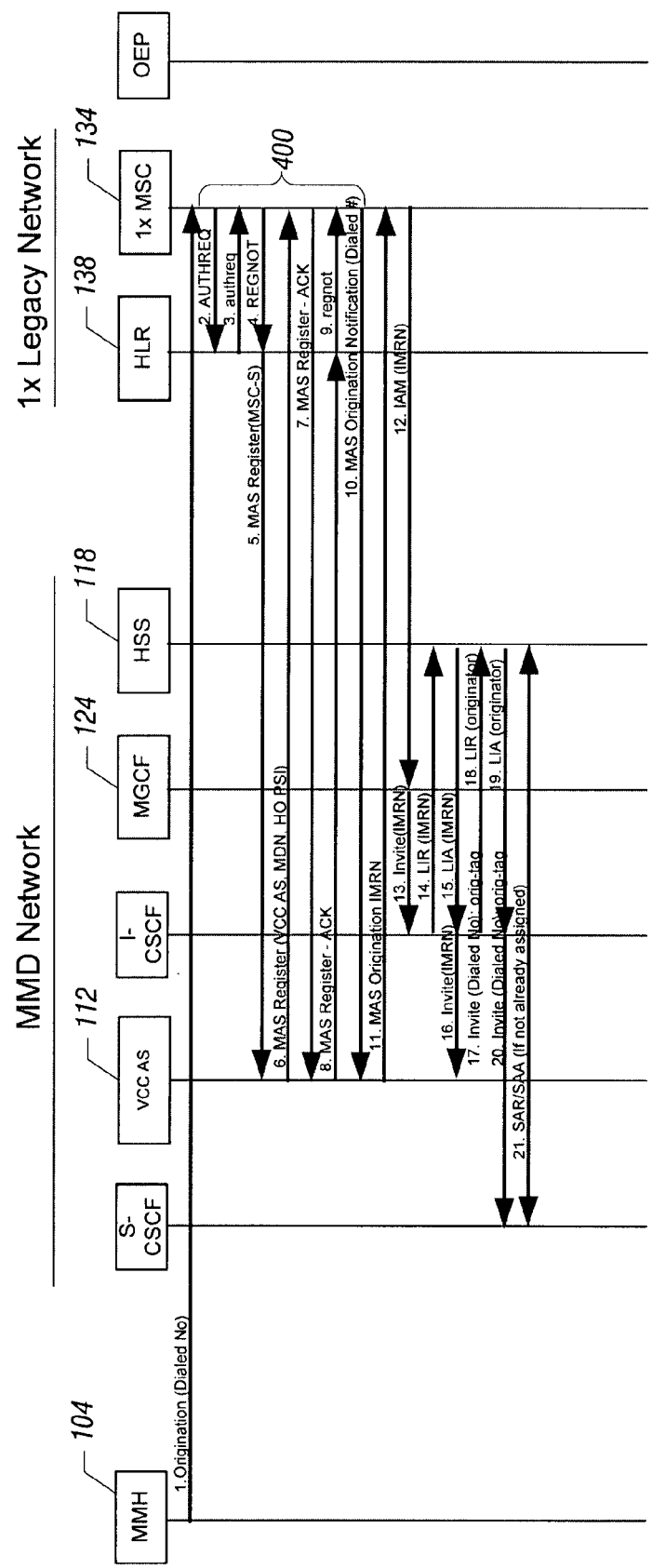

FIG. 4 shows call origination that is initiated by the mobile station 104 when the mobile station 104 is attached to the 1xRTT access network (base station 110). Calls originated by the mobile station may be anchored in the MMD network at the VCC application server 112 so that inter-domain transfers can be supported. In some implementations, the mobile station does not allow voice services to be active in multiple domains at the same time. For example, in the event of a race condition in which the mobile station initiates a call on domain x (one of the 1xRTT and the MMD domains) while the network is in the process of delivering a call via domain y (the other of the 1xRTT and MMD domains), the mobile station should reject the incoming call via domain y, and the network should attempt to redeliver the call via domain x.

As depicted in FIG. 4, the mobile station initiates a call by sending a 1xRTT Origination message (which contains a Dialed No) (step 1) to the MSC 134. Note that the Dialed No is the dialed number of the other end point (OEP) in FIG. 4. If implicit registration is required, then a registration procedure 400 is performed, where the registration procedure 400 is the same as the registration procedure corresponding to steps 2-9 of FIG. 2. Implicit registration is required if the user is not yet registered.

Next, the MSC sends (step 10) an MAS Origination Notification message to the VCC application server 112, where the MAS Origination Notification messages contains Dialed No of the destination, as well as the mobile directory number of the originator (in this case the mobile station 104). The VCC application server records the dialed number (Dialed No) for the destination user, and returns an IMRN (IP Mobility Routing Number) to the MSC 134 in an MAS Origination IMRN message (step 11). The MAS Origination IMRN message is an MAS control message that contains the 1xRTT Origination IMRN control indication. The IMRN is to be used for extending the call into the MMD network prior to call delivery to the OEP.

The IMRN selected by the VCC application server 112 may be sensitive to the VCC application server serving the destination user and/or the specific serving MSC to ensure that the MGCF nearest to the serving MSC is selected. If the VCC application server has determined that the call should not be anchored, then the VCC application server would return the originally dialed number to the MSC for routing. This determination is part of the selective anchoring process to be discussed further below.

After receiving the MAS Origination IMRN message (step 11), the MSC places the IMRN in the called party number and generates an ISUP Initial Address Message (IAM) that is directed towards the IMRN. This causes the JAM to be directed towards the MGCF 124 in the MMD network (step 12). In response to the IAM message, the MGCF sends (step 13) a SIP Invite message, which is routed to the I-CSCF (step 13). In response to the Invite message, the I-CSCF sends a Location Information Request (LIR) message that is sent (step 14) to the HSS for the IMRN. This request is sent to find out where the IMRN is to be routed. The HSS responds with an LIA message (step 15) that is sent back to the I-CSCF, where the LIA message identifies the VCC application server. The I-CSCF then forwards (step 16) the Invite message containing the IMRN to the VCC application server.

The VCC application server 112 anchors itself in the signaling path and initiates a call to the real dialed number (stored between steps 10 and 11). The VCC application server then sends (step 17) an Invite message containing the Dialed No, along with an orig-tag flag that indicates that the message is associated with the originator, to the I-CSCF. The I-CSCF then sends an LIR (step 18) message to the HSS, where the LIR message contains an originator identifier, which is the identifier of the mobile station. The HSS responds (step 19) with an LIA message that contains the identity of the appropriate serving CSCF (S-CSCF) to serve the originator based on the MMD registration state, any active unregistered sessions, and the specific session request. The I-CSCF then forwards (step 20) the Invite message containing Dialed No to the identified S-CSCF. If the S-CSCF is not already assigned to the destination user, then a server assignment is performed using the SAR/SAA exchange (step 21).

At this point, normal call delivery procedures are followed, in which the appropriate SIP messages, including SIP Invite, Ringing, and OK, are exchanged. The normal call delivery procedure to complete the call origination is similar to call delivery to the mobile station 104 that is attached to the 1xRTT access network, as depicted in FIG. 5.

Figure 5:
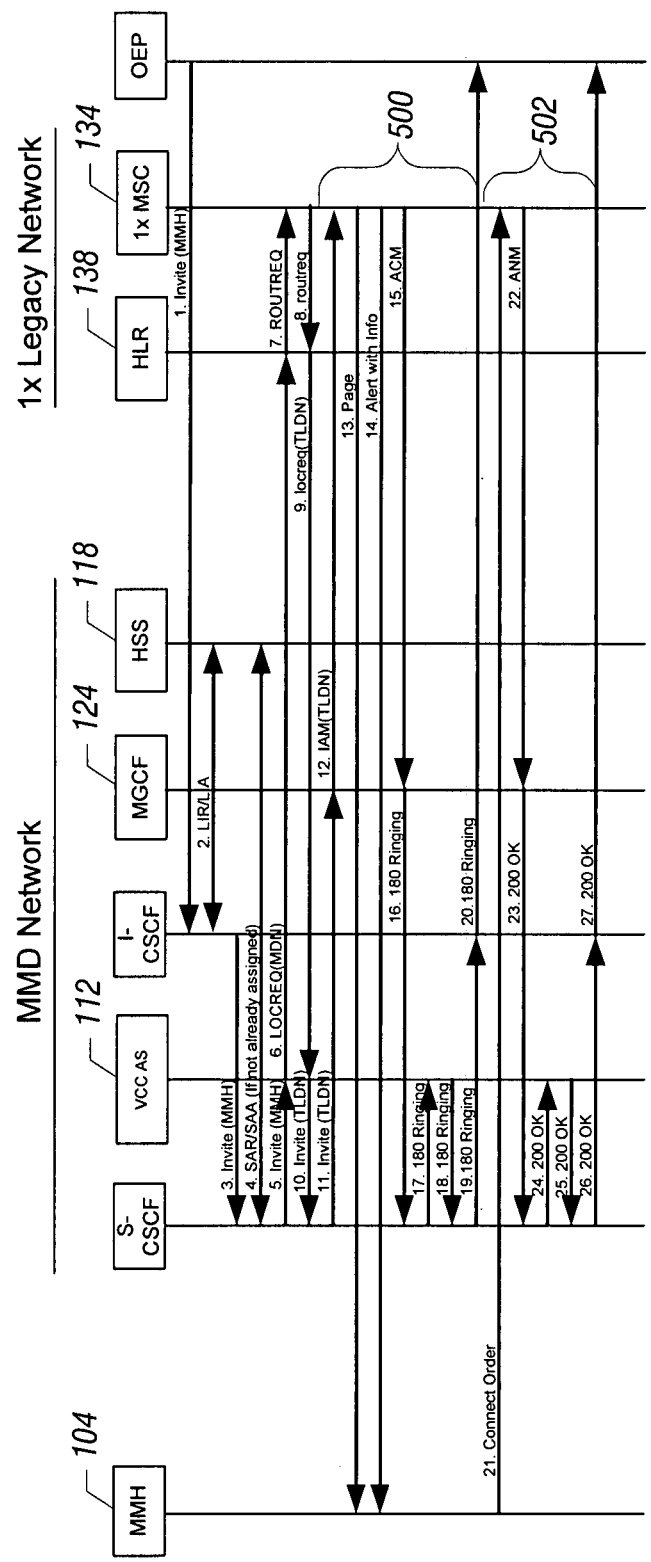

FIG. 5 shows call delivery to the mobile station that is attached to the 1xRTT access network, where the procedure of FIG. 5 is the same as a conventional procedure. As depicted in FIG. 5, a call initiated by the OEP (Other End Point) and terminated at the mobile station 104 is performed by sending an Invite message (that contains the identifier of the mobile station, indicated as MMH in FIG. 5). The Invite message is received in the home MMD network of the mobile station 104 at the I-CSCF. A location information request (LIR/LIA) is performed (step 2) by the I-CSCF with the HSS. In response, the I-CSCF sends the Invite message to the S-CSCF that serves the mobile station 104 (step 3). If the user is not already active on the S-CSCF, then the S-CSCF performs server assignment (SAR/SAA) at step 4.

The S-CSCF then invokes the VCC application server 112 for call delivery assistance (by sending the Invite message at step 5). If the user is not yet registered in the MMD network or if the VCC AS call delivery criteria is to prefer 1xRTT call delivery, the VCC application server attempts to locate the mobile station 104 in the 1xRTT network and launches a LOCREQ message to the HLR (step 6). The HLR then sends a ROUTREQ message to the serving MSC (step 7), which returns a routreq message with the temporary location directory number (TLDN). The MSC returns a routreq message with the TLDN (step 9) to the VCC application server 112.

The VCC application server then anchors itself in the call signaling path and initiates a call leg to the TLDN (step 10). Subsequently, normal MMD call processing and 1xRTT call delivery procedures are performed (steps 11-27). The messages exchanged in the steps of 500 causes the mobile station 104 to be alerted. The steps performed at 502 are performed in response to the mobile station 104 answering the call alert, with the answer propagated back to the originator (OEP).

For a multi-mode mobile station attached to a packet-switched access network, the call origination and call delivery flows do not change from conventional procedures.

Voice calls to be delivered to a mobile station 104 are routed first to the MMD domain, where the call is statically anchored and terminating services are applied. As part of the call delivery processing, the optimal call delivery path is decided by the VCC application server. The decision criteria for the call delivery path include the active call state, ALR data, user preferences, and network preferences. If the MMD network is chosen as the optimal delivery path for a specific device, then the normal MMD call delivery processing proceeds. However, if the 1xRTT network is chosen to be the optimal delivery path, then the VCC application server launches a LOCREQ request to the HLR in an attempt to locate the user and retrieve the TLDN.

If the user is 1xRTT registered with a MSC that does not support the MAS model, then there is no MAS registration. As a result, the call can be delivered using typical 1xRTT call delivery procedures. In this case, inter-domain handoff is not supported for the call and any mid-call services provided to the end user is to be provided by the MSC.

RF coverage availability for a mobile station is tracked by the ALR 113 based on both direct updates from the mobile station, and indirectly based on inter-domain handoffs, call originations, call terminations and other relevant network events. In accordance with some embodiments, each ALR update includes a timestamp from the mobile station. If the mobile station is not synchronized with the network, then the ALR can calculate the time-offset at registration time and use that in place of the actual timestamp. Any time an update is made, the ALR timestamps the update. Stale updates are acknowledged and ignored, where a stale update refers to an update whose timestamp is earlier then the time-stamp of the most recently processed ALR event.

The mobile station will update, using the Notify message, not only when the mobile station is attached to the packet-switched access network, but when the mobile station loses connection to the packet-switched access network. For example, when the mobile station is roaming in an EV-DO access network, the mobile station should send a Notify prior to tuning away from the EV-DO access network. In a handoff scenario, explicit Notify messages do not have to be sent by the mobile station since the network can automatically update the ALR based on the handoff. However, if the handoff is performed for reasons other than RF reasons, the mobile station may be required to send a Notify message that the RF is still available.

Figure 6:
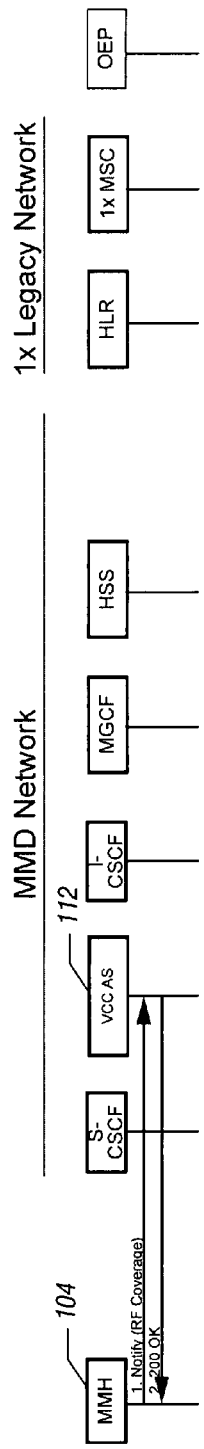

FIG. 6 shows a message flow for performing an ALR update when the packet-switched access network is available to the mobile station. The mobile station sends (step 1) a Notify message (that contains information relating to the RF condition) to the VCC application server 112. The RF update information is used to update information contained in the ALR 113 pertaining to the mobile station 104. The application server responds (step 2) with a SIP 200 OK message to the mobile station to acknowledge the Notify message.

In accordance with some embodiments, the Notify message containing the RF Coverage information can also include a timestamp associated with the Notify message. This is to allow the VCC application server 112 to determine whether or not the RF update information provided has become stale, which can occur if for some reason the notification is received some time period after the mobile station 104 transmitted the Notify message.

Note that the delay in receipt of the Notify message is less likely in the case where the mobile station is attached to the packet-switched access network than when the mobile station is attached to the 1xRTT access network (the packet-switched access network is not available), and the serving MSC is a non-MAS capable MSC. The message flow for performing the ALR update in this scenario (packet-switched access network is not available, and the serving MAS is a non-MAS capable MSC), is depicted in FIG. 7.

Figure 7:
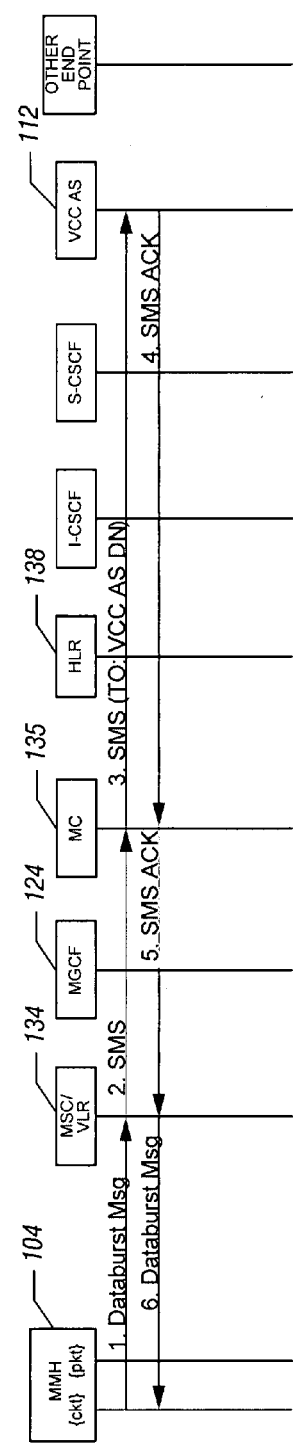

As indicated by FIG. 7, when the mobile station 104 detects loss of the packet-switched access network (the packet-switched access network RF is lost), the mobile station 104 composes an SMS (short message service) databurst message that is sent (step 1) from the mobile station 104 to the MSC 134. The payload of the databurst message contains the current RF coverage information, as well as a timestamp. The SMS databurst message is sent to the ALR PSI (which was sent to the mobile station during registration) (see FIG. 2).

The MSC (which in this case is a non-MAS capable MSC) processes the databurst message and generates an SMS message that is sent (step 2) from the MSC 134 to the SMS messaging center 135. The SMS message is sent to the ALR PSI/DN that is requested by the SMS databurst message originated by the mobile station 104. The messaging center forwards the SMS message to the VCC application server 112 (step 3). Note that the SMS message sent at step 3 has a To: address of VCC AS DN (note that this is the same as the ALR PSI/DN since the ALR 113 is located in the VCC application server 112 in the example implementation).

The VCC application server 112 receives the SMS message and compares the timestamp to the current time and updates the ALR 113 if appropriate. If the timestamp indicates a time earlier than the most recently processed ALR event, then the RF coverage update is considered stale. The VCC application server/ALR acknowledges the SMS message received at step 3, by sending an SMS ACK message (step 4) to the messaging center 135. The messaging center 135 forwards (step 5) the SMS ACK message to the MSC 134. In turn, the MSC 134 acknowledges the original SMS databurst message (step 1) with an acknowledgment databurst message (step 6) that is sent back to the mobile station 104.

Figure 8:
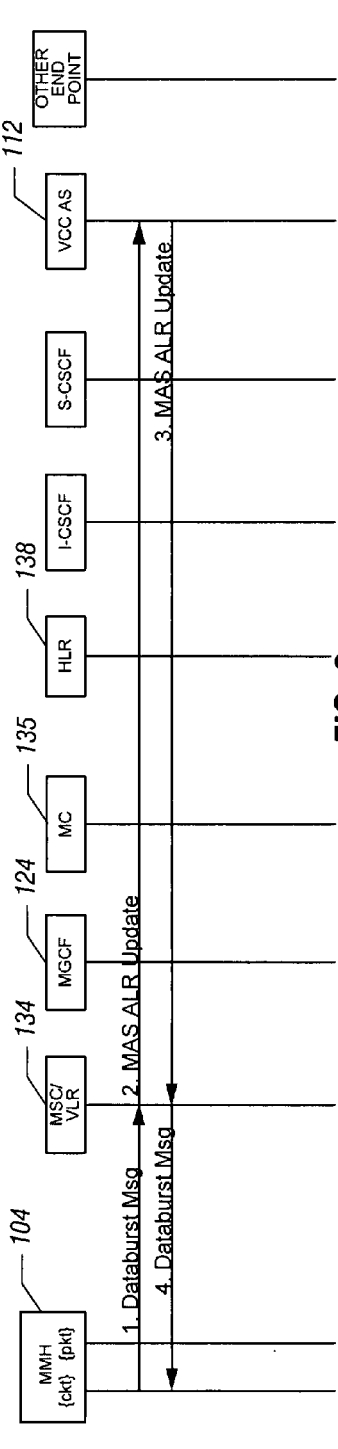

FIG. 8 shows an ALR update initiated by the mobile station 104 when the packet-switched access network is not available, but the serving MSC is MAS-capable. When the mobile station 104 detects loss of the packet-switched access network, the mobile station composes an SMS databurst message that contains the RF coverage condition, as well as the current timestamp. The databurst message is sent (step 1) from the mobile station 104 to the MSC 134. Since the MSC 134 is MAS-enabled, the MSC 134 sends an MAS ALR Update message (step 2) to the VCC application server/ALR. The MSC recognizes that this is an MAS mobile station request and compares the destination address to the ALR PSI/DN received at the time of the MAS registration. Because the databurst destination and the ALR PSI/DN match, the MSC composes a MAS ALR Update message that is sent (step 2) to the VCC AS/ALR.

The VCC AS/ALR compares the timestamp against the timestamp of the most recently processed ALR update event and updates the ALR if appropriate (in other words, the timestamp of the most recently processed ALR event is not greater than the timestamp provided in the RF coverage update request). The VCC AS/ALR acknowledges the update with an MAS ALR Update message (step 3) that is sent to the MSC 134. The MSC 134 then acknowledges the initial SMS databurst message (step 1) with an acknowledge databurst message (step 4) that is sent to the mobile station 104.

When a mobile station is attached to a MAS-capable MSC, the MSC enters "MAS mode." In this mode, the MSC forwards mid-call service messages (e.g., flash, flash with information, etc.) to the MMD network. Likewise, the MSC also accepts mid-call service messages from the VCC application server 112 and forwards them to the mobile station. The MSC, when operating in MAS mode, does not act on a service request itself.

Figure 9:
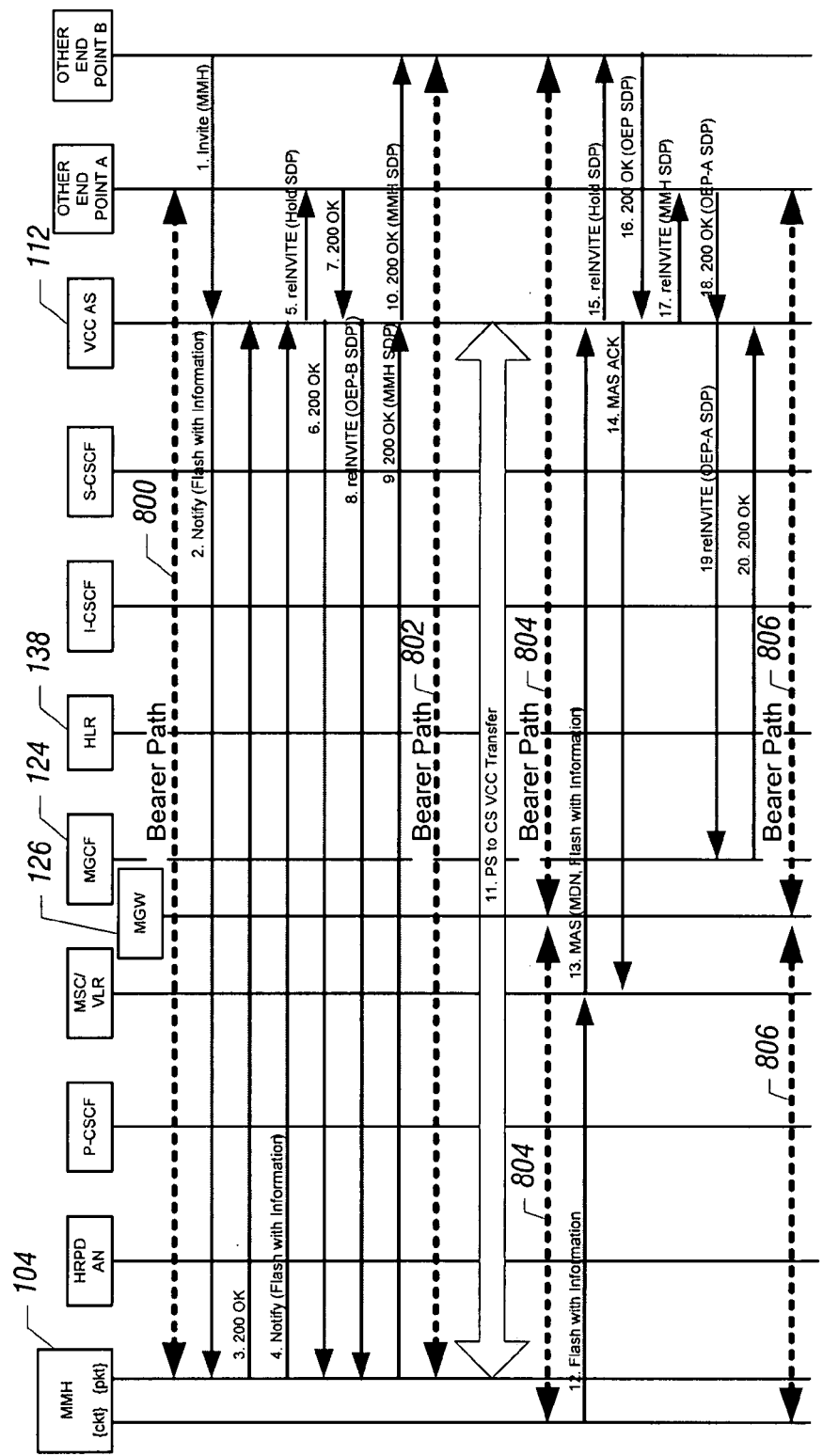

As depicted in FIG. 9, a bearer path (800) is assumed to have been established between the mobile station 104 and OEP A (which is a first other end point). Mid-call services will be established in response to requests from another end point, referred to as OEP B. While the mobile station 104 is in an active communication session with OEP A over bearer path 800, OEP B sends an Invite message (step 1) that contains the mobile station (MMH) as the destination. The Invite message is received by the VCC application server 112. In response to the Invite message, which triggers a call waiting feature, the VCC application server 112 sends a Notify message that contains a 1xRTT flash with information notification to the mobile station 104 (step 2). For mid-call services, the mobile station 104 is modified to recognize 1xRTT mid-call control messages in SIP messages, such as the 1xRTT flash with information indication contained in SIP Notify.

The mobile station 104 acknowledges the Notify message with a 200 OK message (step 3) that is returned back to the VCC application server 112. If the user at the mobile station 104 accepts the call waiting (such as by clicking a "flash" button), the mobile station 104 indicates the acceptance of the call waiting by sending a Notify message that contains the 1xRTT flash with information message to the VCC application server 112 (step 4). In response to the Notify message received at step 4, the VCC application server sends a reINVITE message (step 5) to OEP A, where the reINVITE message contains a Hold SDP indication to place OEP A on hold. The VCC application server 112 acknowledges the Notify message received at step 4 with a 200 OK message (step 6). OEP A acknowledges the reINVITE message with a 200 OK message (step 7).

Next, the VCC application server 112 sends a reINVITE message to the mobile station 104, where the reINVITE message contains SDP information associated with OEP B. The SDP information includes audio/video capabilities, audio CODECs capabilities, and so forth. In response to the reINVITE message at step 8, the mobile station 104 sends a 200 OK message (step 9) that contains SDP information associated with the mobile station 104. The 200 OK message of step 9 is received by the VCC application server 112, which responds by sending a 200 OK message to OEP B (step 10). The 200 OK message also contains the SDP information associated with the mobile station 104. At this point, a bearer path 802 is established between the mobile station 104 and OEP B. Note that the bearer path 800 between the mobile station 104 and OEP A is still active, except that now it is on hold.

While the mobile station 104 is in an active session with OEP B, a packet-switched domain to circuit-switched domain transfer can occur (step 11). Examples of such transfers are discussed further below. As a result of the transfer, the mobile station 104 is now attached to the 1xRTT access network rather than the packet-switched access network. Because of the transfer to the 1xRTT domain, the media gateway 126 is now involved in the bearer path (804).

At some point, the user of the mobile station 104 may wish to re-connect back to OEP A by hitting the "flash" button of the mobile station 104. In response to this flash indication, the mobile station sends a 1xRTT Flash with Info message to the MSC 134 (step 12). In response, the MSC 134 sends an MAS message that contains the mobile directory number of the mobile station 104, as well as the flash with information message to the VCC application server 112 (step 13). An acknowledge MAS ACK is sent from the VCC application server 112 to the MSC 134 to acknowledge the MAS message that contains the flash with information message (step 14).

Also, the VCC application server 112 sends a reINVITE message to OEP B, where the reINVITE message contains the Hold SDP indication to cause OEP B to be placed on hold. OEP B acknowledges the reINVITE message with a 200 OK message (step 16). Next, the VCC application server 112 sends (step 17) a reINVITE message to OEP A that contains SDP information of the mobile station 104 (MMH SDP). OEP A acknowledges this reINVITE message with a 200 OK message that contains the SDP information of OEP A (step 18). The VCC application server 112 then sends a reINVITE message to the MGCF 124, where the reINVITE message contains the SDP information of OEP A. The MGCF acknowledges the reINVITE message with a 200 OK message (step 20). At this point, a bearer path is established between the mobile station 104 and OEP A through the media gateway 126.

FIG. 9 shows a network-initiated mid-call service while the mobile station is attached to the packet-switched access network (steps 2-9) and a mobile station 104-initiated mid-call service while the mobile station is attached to the 1xRTT access network (steps 12-20). It is noted that when the mobile station 104 is attached to the packet-switched access network, the mobile station 104 can similarly place an OEP on hold by sending a Notify message containing the flash with information message to the VCC application server, which responds by sending a reINVITE message to the OEP that is to be placed on hold.

Note also that a network-initiated mid-call service that is performed when the mobile station 104 is attached to the 1xRTT access network would cause the VCC application server to send a flash with information message containing the mobile directory number to the MSC (rather than the Notify message sent from the VCC application server to the mobile station performed in step 2 of FIG. 9). The MSC then responds to the flash with information message by forwarding the flash with information message to the mobile station 104 to place the mobile station on hold.

As noted above, the multi-node mobile station is also able to perform inter-domain transfer between a packet-switched domain and a circuit-switched domain. FIG. 10 shows handoff or transfer between a WiFi packet-switched domain and a 1xRTT circuit-switched domain. In the call flow of FIG. 10, it is assumed that the MSC 134 is provisioned with a predefined handoff code, referred to as a "1x HO Code" that indicates a WiFi to 1xRTT transfer is being requested. It is also assumed in FIG. 10 that there is a 2-way call from the MMH connected via WiFi access to the other end point OEP at the onset of the call flow. To perform the transfer from WiFi to 1xRTT, the mobile station 104 sends an Origination request that contains the 1x HO Code to the MSC 134 (step 1). The 1x HO Code is interpreted by the MSC as a trigger to look up the HO PSI of the VCC application server that is associated with the requesting mobile station 104. Note that the HO PSI of the VCC application server was provided to the MSC at MAS registration time.

In response to the handoff request, the MSC 134 sends an ISUP IAM message that contains the HO PSI to the MGCF 124 (step 2). Note that the IAM message also contains the mobile directory number of the mobile station 104. Since the HO PSI is assigned at 1xRTT registration time, HO PSI may be sensitive to the serving MSC assigned to the user, specific VCC application assigned to the user, and so forth.

Next, the MGCF 124 generates an Invite message that is directed to the HO PSI, which is sent to the I-CSCF (step 3). In response, the I-CSCF sends a Location Information Request (LIR) to the HSS based on the HO PSI (step 4). This request is made to identify the serving CSCF (S-CSCF) for the user. The HSS returns (step 5) a Location Information Ack (LIA) to the I-CSCF, where the LIA identifies the S-CSCF for the mobile station 104.

The I-CSCF then forwards an Invite message containing the HO PSI to the VCC application server (step 6). In response, the VCC application server sends a reINVITE message containing the SDP information for the media gateway 126 (MGW SDP) (step 7). This reINVITE message is forwarded to the other end point (OEP) (step 8).

In response, the OEP responds with a 200 OK message that contains the SDP information for the OEP (step 9). This 200 OK message is forwarded by the S-CSCF to the VCC application server (step 10). At this point, the OEP has acknowledged the transfer of the call to be routed through the media gateway 126, which is provided in the bearer path between the circuit-switched network and the packet-switched network.

In response to the 200 OK message, the VCC application server 112 sends a SIP BYE message to the S-CSCF to terminate the WiFi call leg (step 11). This BYE message is forwarded by the S-CSCF to the mobile station 104 (step 12). The mobile station 104 acknowledges the BYE message with a 200 OK message (step 13). The 200 OK message is forwarded by the S-CSCF to the VCC application server (step 14).

Concurrently with sending the BYE message at step 11, the VCC application server also forwards the 200 OK message containing the SDP information of the OEP to the S-CSCF (step 15). This 200 OK message is forwarded to the MGCF 124 (step 16), which in turns sends an ISUP ANM message to the MSC 134. This effectively causes the transfer to be completed to the 1xRTT network.

FIG. 11 shows transfer from the 1xRTT domain to the WiFi domain. To do so, the mobile station 104 sends a SIP Invite message to the S-CSCF (step 1), where the Invite message contains the VCC HO PSI, and the SDP information of the mobile station (MMH SDP). This Invite message is forwarded to the VCC application server (step 2). In response, the VCC application server sends a reINVITE message to the S-CSCF (step 3), where the reINVITE message contains the SDP of the mobile station 104. The S-CSCF forwards the reINVITE message to the OEP (step 4). The OEP acknowledges the reINVITE message with a 200 OK message that contains the SDP of the OEP (step 5), to acknowledge that the OEP has accepted the transfer. This 200 OK message is forwarded by the S-CSCF to the VCC application server (step 6).

In response to the acknowledgment that the OEP has accepted the transfer to the packet-switched domain, the VCC application server sends a BYE message to the MGCF 124 (step 7), where the BYE message is to release the 1xRTT call leg. In response to the BYE message, the MGCF 124 sends an ISUP RLS message to the MSC 134 (step 8). This releases the original 1xRTT call leg. The MGCF 124 also sends a 200 OK message to acknowledge the BYE message (step 9). This 200 OK message is forwarded by the VCC application server to the S-CSCF (step 10), which then forwards the 200 OK message containing the SDP of the OEP to the mobile station 104 (step 11). This completes the inter-domain transfer from 1xRTT to WiFi.

Figure 12:
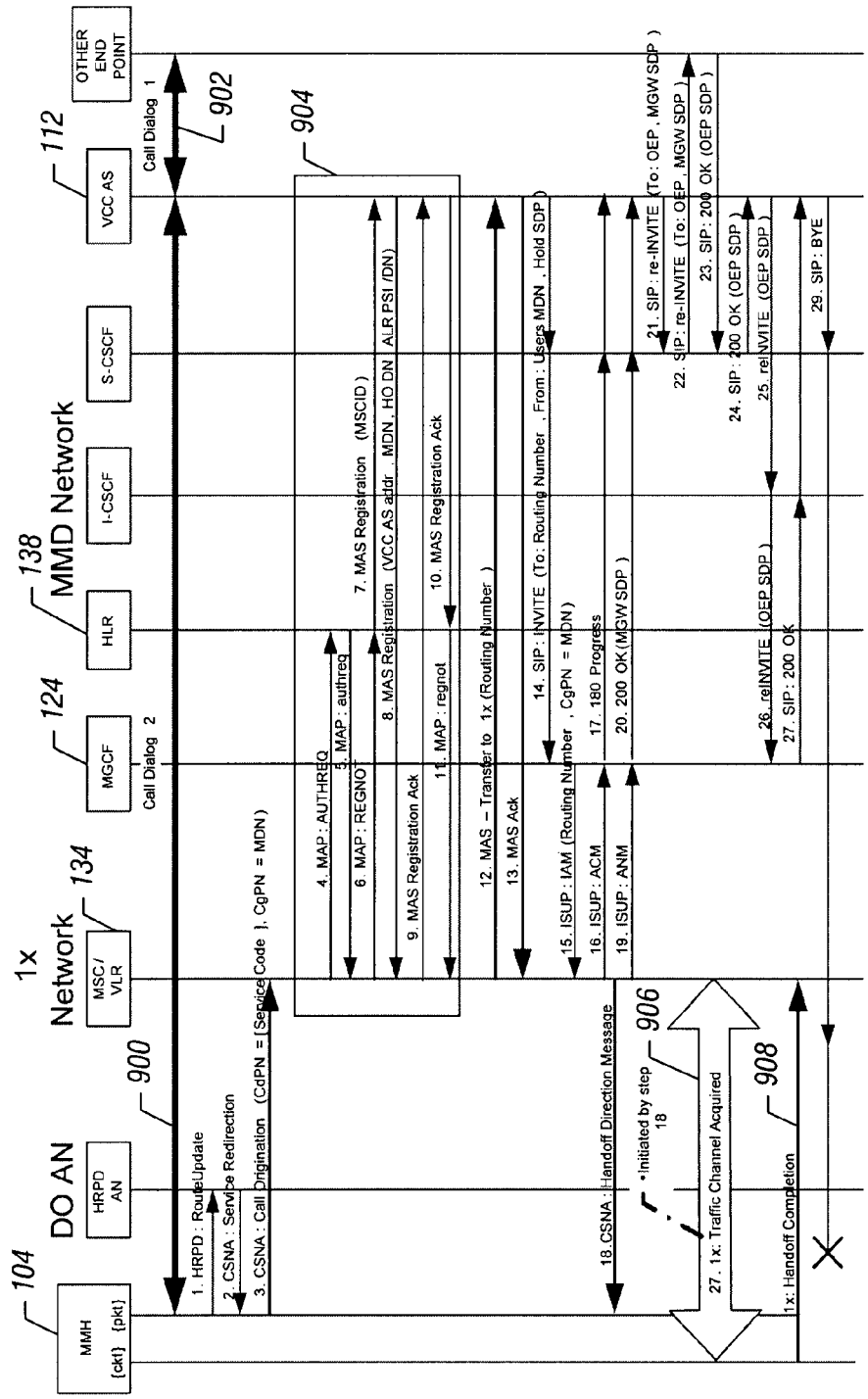

FIG. 12 shows a transfer between a 1xEV-DO domain (also referred to as HRPD) and the 1xRTT domain. A call dialog 900 is provided between the packet-switched interface of the mobile station 104 and the VCC application server, and further call dialog 902 is provided between the VCC application server and the OEP to establish the 1xEV-DO session. At some point, the mobile station can decide to perform a transfer from the 1xEV-DO to the 1xRTT domain. To do so, the mobile station 104 sends an HRDP RouteUpdate request to the HRPD access network (the 1xEV-DO access network) (step 1). In response, the HRPD access network returns a CSNA (Circuit Services Notification Application) Service Redirection message (step 2) to the mobile station 104 to indicate service redirection to 1xRTT. In response, the mobile station 104 sends a 1xRTT Call Origination message to the MSC 134 (step 3), where the Call Origination message contains a service code to perform the handoff, as well as the mobile directory number of the mobile station 104. HLR registration and MAS registration (904) are performed if the mobile station 104 was not previously 1xRTT registered (steps 4-11).

Next, the MSC 134 sends an MAS message that contains a transfer to 1xRTT control indication to the VCC application server (step 12). Note that the transfer indication in the MAS message is a 1xRTT control message. The transfer to 1x control indication contains a TLDN. The VCC application server responds with an MAS ACK message (step 13).

Also, the VCC application server sends a SIP Invite message to the MGCF 124 (step 14), where the Invite message contains a To: address that is equal to the routing number (TLDN) provided by the MAS transfer to 1x message (step 12), and a From: address that is equal to the mobile directory number of the mobile station 104. The Invite message also contains a Hold SDP. In response to the Invite message, the MGCF 124 sends an ISUP IAM message to the MSC 134 (step 15), where the IAM message contains the routing number (TLDN), as well as the mobile directory number of the mobile station 104. In response to the IAM message, the MSC 134 sends an ACM message to the MGCF 124 (step 16). The MGCF 124 responds to the ACM message by sending a SIP 180 Progress message to the C-CSCF (step 17), which is forwarded to the VCC application server. The Progress message is sent to indicate that the MGCF is processing the Invite message sent at step 14.

The MSC 134 also sends a CSNA Handoff Direction Message to the mobile station 104 (step 18) to request that the mobile station 104 handoff to the 1xRTT access network. Next, the MSC 134 sends an ISUP ANM message to the MGCF 124 to answer the IAM request (step 19). This causes the MGCF 124 to send a 200 OK message to the S-CSCF (step 20), where the 200 OK message contains the SDP information for the media gateway 126. The 200 OK message is forwarded by the S-CSCF to the VCC application server.

Upon receiving the 200 OK message, the VCC application server performs a reINVITE of the other end point by sending a SIP reINVITE message to the S-CSCF (step 21). The S-CSCF forwards the reINVITE message to the OEP (step 22). The OEP acknowledges the reINVITE message with a 200 OK message that contains the SDP information of the OEP (step 23). The S-CSCF forwards the 200 OK message to the VCC application server (step 24). In response, the VCC application server sends a reINVITE message to the I-CSCF (step 25), where the reINVITE message contains the SDP information of the OEP. This reINVITE message is forwarded by the I-CSCF to the MGCF 124 (step 26). The MGCF 124 acknowledges the reINVITE message by sending a 200 OK message to the I-CSCF (step 27), which is forwarded to the VCC application server. Next, the VCC application server sends a BYE message to the mobile station (step 29) to cause the original 1xEV-DO call leg to be terminated.

In response to the handoff direction message (step 18), the mobile station 104 acquires a 1xRTT traffic channel (906). When the traffic channel is acquired, the mobile station sends a 1xRTT Handoff Completion message (908) to the MSC 134. At this point, the transfer from the 1xEV-DO domain to the 1xRTT domain is complete.

In accordance with some embodiments, a selective anchoring feature can also be provided in the MAS model. The selective anchoring feature allows for the ability to selectively anchor multi-mode mobile station circuit-switched attached calls in the packet-switched domain. This capability enables an operator to engineer its networks so that only 1xRTT calls meeting predefined criteria are routed through the packet-switched domain, thereby limiting packet-switched domain resource consumption from 1xRTT attached multi-mode mobile station users.

With selective anchoring, an operator is able to dynamically dictate when 1x attached multi-mode mobile station call originations or call terminations are anchored by a VCC application server in the packet-switched domain. This allows a circuit-switched attached mobile station to bypass the packet-switched network when appropriate to do so.

Selective call anchoring in the packet-switched domain is provided on a per-call basis. Anchoring in the packet-switched domain (and more specifically the MMD domain) refers to the following: (1) call signaling and bearer paths are routed through the packet-switched domain (e.g., MMD domain); (2) the VCC application server is responsible for application of mid-call services for the anchored mobile station; and (3) the anchored mobile station is eligible for initiating a VCC call transfer. A call can be considered not anchored if any one of the above three conditions is not true. Therefore, it is possible for a call that is routed through the packet-switched domain to not be considered as anchored.

All simultaneously active call sessions of a multi-mode mobile station are to be treated the same with respect to anchoring for proper service operation. Thus, if a mobile station is involved in a call that is not anchored, and should a mid-call service result in a second call leg, then the second call leg will not be anchored. Furthermore, the mobile station is not eligible for anchoring again until the mobile station goes idle and a new call session is initiated. Similarly, if the mobile station is involved in a call that is anchored, and should a mid-call service result in a second call leg, that second call leg is also anchored.

Figure 13:
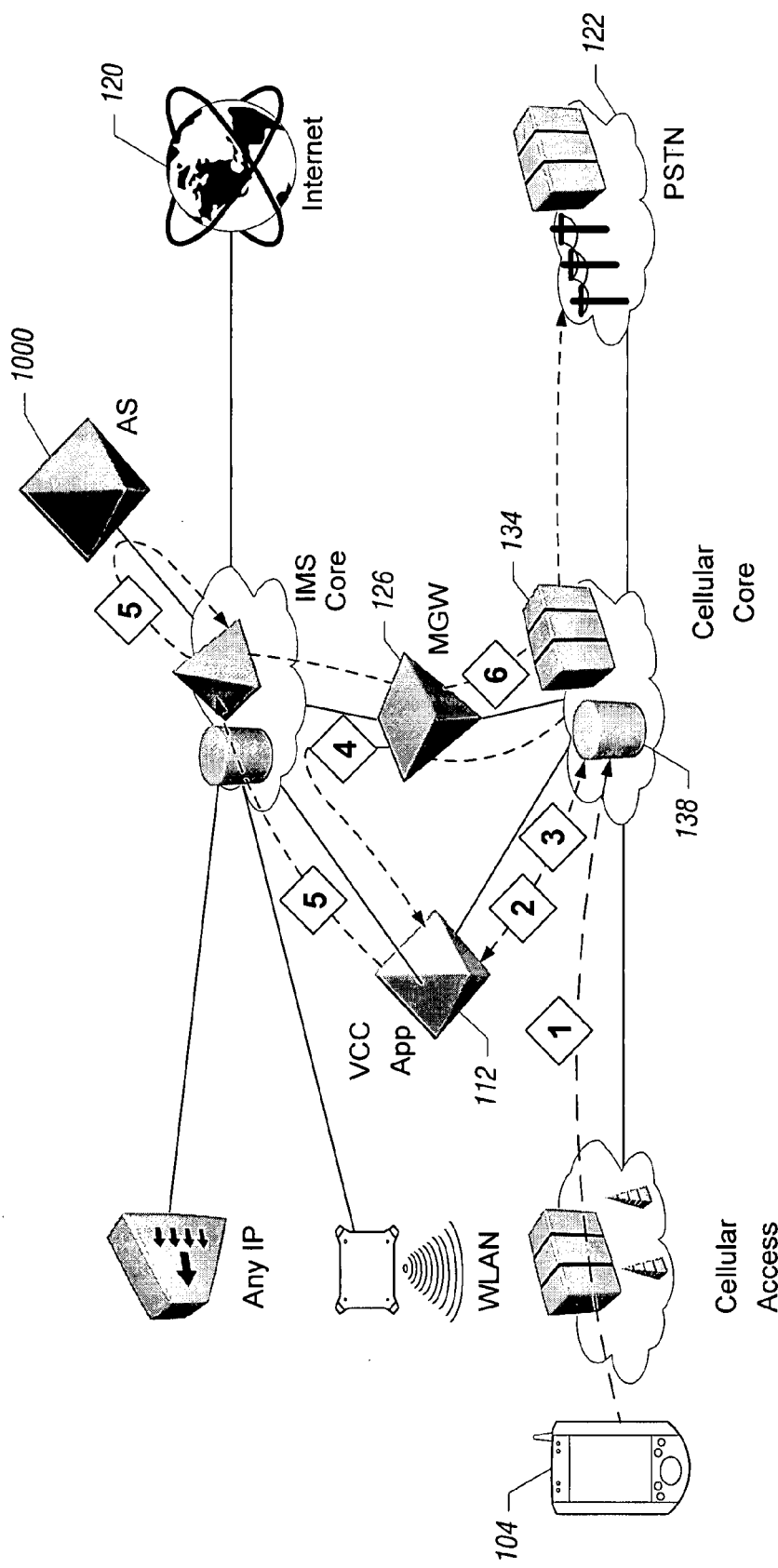

FIG. 13 shows an example call origination flow that involves the selective anchoring feature. Here, the mobile station 104 originates a circuit-switched call with dialed digits (step 1). In response to the origination request from the mobile station, the MSC 134 queries the VCC application server (step 2) by submitting an MAS Origination request message containing the dialed number to determine anchor selection. The VCC application server decides, based on various criteria, whether or not the requested call is to be anchored in the packet-switched domain. In this example, the VCC application server elects to anchor the call, and returns an IMRN to direct the call into the packet-switched domain (step 3). As a result, the call is routed to the VCC application server per the IMRN (step 4). The VCC application server anchors the call and makes a packet-switched call origination (such as with the SIP Invite message) to the dialed number provided in step 2.

The call is then routed to an originating service application server 1000. Next, the call is routed to the terminating domain (in this case assumed to be in the PSTN) using standard procedures (step 6).

Figure 14:
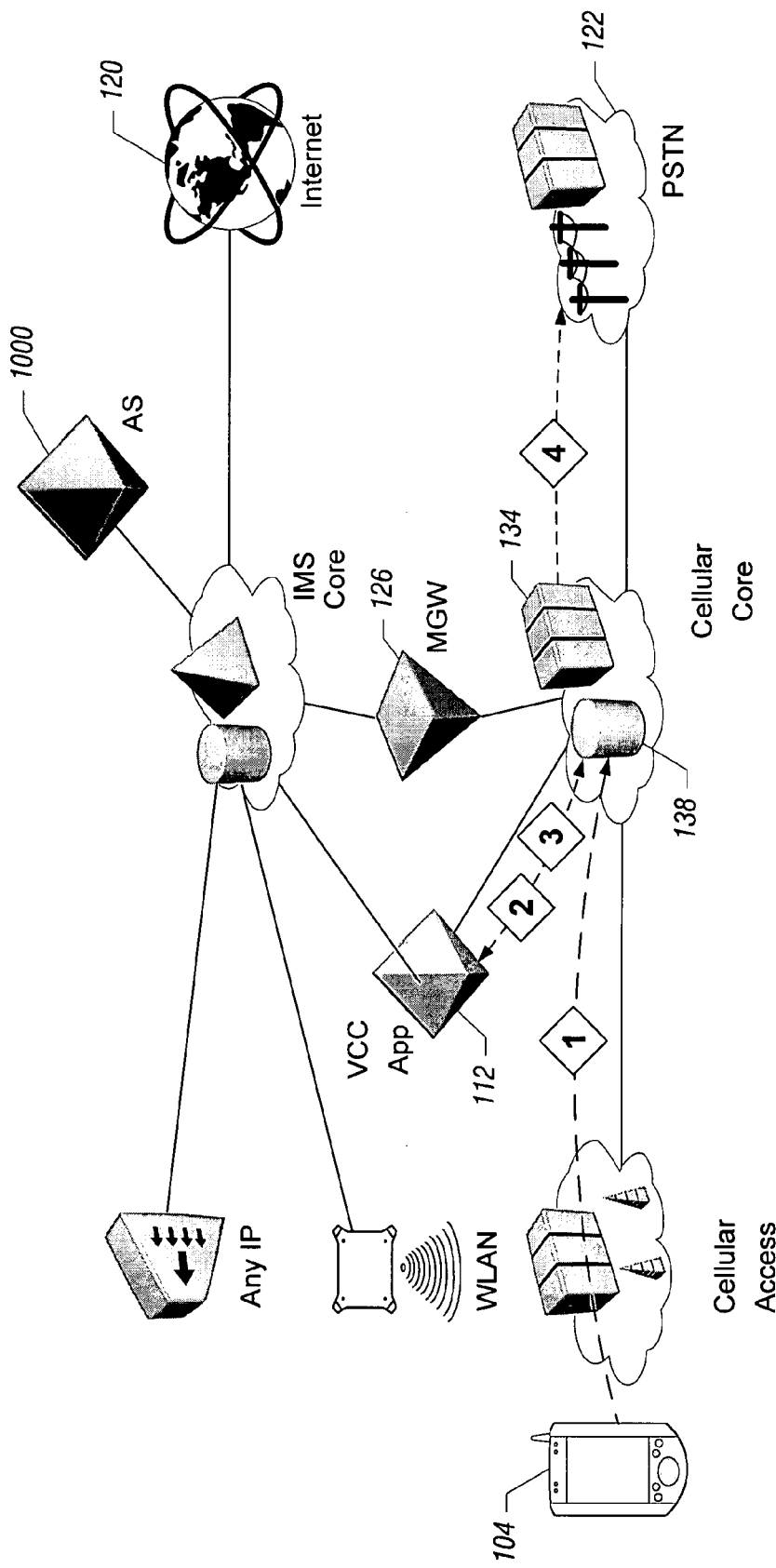

FIG. 14 shows a scenario where the VCC application server decides not to anchor the packet-switched call. Steps 1 and 2 of FIG. 14 are the same as steps 1 and 2 of FIG. 13. However, after the VCC decision not to anchor the call, an indication is provided from the VCC application server to the MSC 134 to continue the call in the circuit-switched domain (step 3). The MSC 134 then proceeds with call delivery using circuit-switched logic (step 4).

The various tasks performed by various nodes discussed above can be performed by software executable on the nodes. Instructions of such software are loaded for execution on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of providing services to a multi-mode mobile station attached to a circuit-switched access network in a circuit-switched domain, comprising:

receiving, at a first node in the circuit-switched domain, a first message from the multi-mode mobile station indicating a service relating to the multi-mode mobile station;

in response to the first message, sending, over a signaling interface, from the first node in the circuit-switched domain to a second node in a packet-switched domain, a control message containing a circuit-switched control indication to enable the service to be performed, wherein the signaling interface is between the first node and the second node, and the signaling interface is separate from an interface between a media gateway control function and the circuit-switched domain, and wherein each of the first node and second node is a corresponding control node distinct from any mobile station;

allowing the second node in the packet-switched domain to control anchoring of the services for the multi-mode mobile station at the second node even though the multi-mode mobile station is attached to the circuit-switched access network;

allowing the multi-mode mobile station to dual-register in the circuit-switched domain and in the packet-switched domain; and when the multi-mode mobile station is dual-registered in the circuit-switched domain and in the packet-switched domain, storing, in the second node, information received from the multi-mode mobile station regarding quality of Radio Frequency (RF) coverage in the circuit-switched access network in the circuit-switched domain or in a packet-switched access network in the packet-switched domain to which the multi-mode mobile station is attachable, wherein the second node is configured to use the information to detect whether a registration in the circuit-switched domain or in the packet-switched domain is stale.

2. The method of claim 1, wherein sending the control message from the first node to the second node comprises sending the control message from a mobile switching center (MSC) to an application server in the packet-switched domain, and wherein the signaling interface couples the MSC and the application server.

3. The method of claim 2, wherein sending the control message from the MSC to the application server comprises sending the control message from the MSC to a voice call continuity (VCC) application server.

4. The method of claim 1, wherein sending the control message containing the circuit-switched control indication comprises sending the control message containing one of a circuit-switched registration request, a circuit-switched call origination request, and a circuit-switched mid-call service control request.

5. The method of claim 4, wherein receiving the first message comprises receiving one of a registration request from the multi-mode mobile station, a call origination request from the multi-mode mobile station, and a mid-call service request from the multi-mode mobile station.

6. The method of claim 1, wherein sending the control message containing the circuit-switched control indication comprises sending the control message containing a circuit-switched registration request, the method further comprising:

receiving, at the first node from the second node, a second message responsive to the circuit-switched registration request, the second message containing a handoff identity to use for performing handoff between the packet-switched domain and the circuit-switched domain.

7. The method of claim 6, further comprising using the handoff identity during a handoff between the packet-switched domain and the circuit-switched domain.

8. An article comprising at least one non-transitory computer-readable storage medium containing instructions that when executed cause a first node in a packet-switched domain to:

receive, over a signaling interface from a second node in a circuit-switched domain, a control message containing a circuit-switched control indication, wherein the control message is sent by the second node in response to a request received by the second node from a multi-mode mobile station for a service relating to the multi-mode mobile station, wherein the multi-mode mobile station is attached to a circuit-switched access network in the circuit-switched domain, wherein the signaling interface is between the first node and the second node, and the signaling interface is separate from an interface between a media gateway control function and the circuit-switched domain, and wherein each of the first node and second node is a corresponding control node distinct from any mobile station;

in response to the circuit-switched control indication, send a second message to enable provision of the service;

control anchoring of the services for the multi-mode mobile station at the first node in the packet-switched domain even though the multi-mode mobile station is attached to the circuit-switched access network; and when the multi-mode mobile station is dual-registered in the circuit-switched domain and in the packet-switched domain, store, in the first node, information received from the multi-mode mobile station regarding condition of Radio Frequency (RF) coverage in the circuit-switched access network in the circuit-switched domain or in a packet-switched access network in the packet-switched domain to which the multi-mode mobile station is attachable, wherein the first node is configured to use the information to detect whether a registration in the circuit-switched domain or in the packet-switched domain is stale.

9. The article of claim 8, wherein receiving the control message containing the control indication comprises receiving the control message containing a registration request, and wherein sending the second message comprises sending the second message that contains a handoff identity to use during handoff of the multi-mode mobile station between the circuit-switched and packet-switched domains.

10. The article of claim 9, wherein the instructions when executed cause the first node to further receive a Session Initiation Protocol (SIP) message containing the handoff identity during the handoff.

11. The article of claim 8, wherein the instructions when executed cause the first node to send a subscribe request to the multi-mode mobile station to instruct the multi-mode mobile station to notify the first node of an update of the condition of the RF coverage in the circuit-switched access network or in the packet-switched access network.

12. The article of claim 8, wherein the instructions when executed cause the first node to send a notification message to the multi-mode mobile station, the notification message containing a handoff identity to be used during handoff between the circuit-switched and packet-switched domains.

13. The article of claim 8, wherein the instructions when executed cause the first node to further:
receive from the multi-mode mobile station a notification of an update of the condition of the RF coverage in one of the packet-switched access network and the circuit-switched access network.

14. The article of claim 13, wherein receiving the notification comprises receiving a short message service (SMS) message.

15. The article of claim 13, wherein receiving the notification comprises receiving the notification over the signaling interface from the second node.

16. The article of claim 13, wherein receiving the notification comprises receiving the notification that contains a timestamp that indicates a time of the RF condition.

17. The article of claim 16, wherein the instructions when executed cause the first node to further compare the timestamp with a timestamp of a most recently processed notification of RF condition to determine whether the received notification is stale.

* * * * *